United States Patent [19]

Senoue et al.

[11] Patent Number: 4,673,558

[45] Date of Patent: Jun. 16, 1987

[54] METHOD FOR TREATING A WASTE GAS

[75] Inventors: Makoto Senoue, Funabashi; Kunihiko Terase, Tokyo; Keiichi Nakaya, Chiba, all of Japan

[73] Assignee: Asahi Glass Company, Ltd., Tokyo, Japan

[21] Appl. No.: 772,431

[22] Filed: Sep. 4, 1985

[30] Foreign Application Priority Data

Sep. 4, 1984 [JP] Japan ................................. 59-183637

[51] Int. Cl.$^4$ ............................................. B01D 53/34
[52] U.S. Cl. .................................................... 423/240
[58] Field of Search ................ 423/240 S, 240 R, 241, 423/635, DIG. 9; 55/71

[56] References Cited

U.S. PATENT DOCUMENTS 2,919,174 12/1959 Pring ............................... 423/240 S

OTHER PUBLICATIONS

*Chemistry,* John C. Bailar, Jr. et al., Academic Press, 1978 pp. 419-420.

Primary Examiner—John Doll
Assistant Examiner—Jeffrey Edwin Russel
Attorney, Agent, or Firm—Oblon, Fisher, Spivak, McClelland & Maier

[57] ABSTRACT

A method for treating a waste gas containing a fluorine component and/or a chlorine component, which comprises contacting the waste gas with magnesium oxide particles having a specific surface area of from 100 to 200 m$^2$/g.

6 Claims, No Drawings

METHOD FOR TREATING A WASTE GAS

BACKGROUND OF THE INVENTION

1. Field of the Invention

The present invention relates to a method for treating a waste gas containing a fluorine component and/or a chlorine component. More particularly, it relates to a method for effectively trapping a fluorine component or a chlorine component in a waste gas discharged from a process of dry etching a material such as aluminum or silicon with a gas containing fluorine or chlorine.

2. Description of the Prior Art

In recent years, with the development of various electronic equipments, there have been widely used silicon as an electronic substrate, and a metal such as aluminum as an electrode material. Such silicon or aluminum is subjected to etching treatment as the case requires. As an etching agent for such treatment, there may be employed a chlorine component or fluorine component such as $BCl_3$, $SiCl_4$, $CF_4$, $CHF_3$ or $CCl_4$. After the etching treatment, a waste gas containing such a chlorine or fluorine component is discharged. Although the amount of such a waste gas is not very much, the concentration of the chlorine or fluorine component in the gas is relatively high, and it is not allowable to discharge such a gas to the atmosphere from the viewpoint of the prevention of air pollution.

Heretofore, gas adsorption by means of e.g. active carbon has been regarded as being effective as a means for treating such a waste gas, since it does not produce a waste liquid.

However, so-called dry etching is commonly employed as the etching means, whereby the treating gas is forcibly discharged by a vacuum pump from the etching plant, and when the etching treatment is not in operation, nitrogen gas is introduced into the system at a rate of a few liters per minute for the protection of the vacuum pump. Therefore, if active carbon is employed for the waste gas treatment, there will be a drawback that a small amount of the chlorine component or fluorine component trapped will be desorbed from the active carbon and discharged during intermissions of the etching treatment.

Further, U.S. Pat. No. 2,919,174 discloses a method for removing a halogen acid-containing gas such as HF gas by contacting it with a fluidized bed of MgO powder. However, with respect to MgO, no physical properties are given, and therefore, MgO is believed to be of common type which has a specific surface area of at most 80 $m^2/g$. The removal rate of the halogen-containing gas by such MgO is relatively low.

On the other hand, when a halogen-containing gas is removed by means of $Mg(OH)_2$, $MgCO_3$, calcium silicate or quick lime, the removal rate is extremely high at the initial stage, but soon deteriorates to a considerable extent.

In the case where the halogen-containing gas is to be removed by means of $Na_2CO_3$ or $NaHCO_3$, there is a drawback that $Na_2CO_3$ or $NaHCO_3$ tends to be finely pulverized, and the pressure loss of the gas increases substantially.

SUMMARY OF THE INVENTION

The present inventors have conducted various studies with an aim to develop a method for treating a waste gas containing a fluorine component or a chlorine component like a waste gas from dry etching treatment, which method is capable of readily and certainly detoxicating the waste gas and does not permit the desorption of the trapped gas. As a result, it has been found that the above object can be accomplished, without using the adsorption method, by employing a certain specific solid substance which reacts with a halogen to detoxicate it.

Thus, the present invention provides a method for treating a waste gas containing a fluorine component and/or a chlorine component, which comprises contacting the waste gas with magnesium oxide particles having a specific surface area of from 100 to 200 $m^2/g$.

DETAILED DESCRIPTION OF THE INVENTION

In the present invention, as the fluorine component contained in the waste gas, there may be mentioned, for instance, HF or $SiF_4$, and as the chlorine component, there may be mentioned, for instance, $BCl_3$, HCl or $SiCl_4$. These components may be present alone or in combination as a mixture of two or more different kinds.

The magnesium oxide particles to be contacted with the waste gas is required to have a specific surface area of from 100 to 200 $m^2/g$ as measured by BET method. If the specific surface area is less than the above range, the removal rate of the halogen gas will be inadequate. On the other hand, if the specific surface area exceeds the above range, no further improvement in the removal rate of the halogen gas will be obtained. The specific surface area is preferably from 110 to 190 $m^2/g$ in view of an improved removal rate of the halogen gas.

Further, the average particle size of the magnesium oxide particles is preferably from 0.5 to 10 mm. If the average particle size of the magnesium oxide particles is less than the above range, the pressure loss of the gas due to the contact between the magnesium oxide particles and the waste gas tends to be high. On the other hand, if the average particles size exceeds the above range, the reactivity of the magnesium oxide per unit volume tends to decrease, such being undesirable.

As a practical manner for contacting the magnesium oxide particles with the waste gas, there may be employed a reaction system such as a fixed bed, moving bed or fluidized bed system, as the case requires.

Now, the present invention will be described in further detail with reference to Examples. However, it should be understood that the present invention is by no means restricted to these specific Examples.

EXAMPLE 1

Thirty kg of magnesium oxide particles (light-burned magnesia, manufactured by Hokkaido Soda Co., Ltd.) having a specific surface area of 170 $m^2/g$ as measured by BET method, an apparent specific gravity of 0.45 and an average particle size of 3 mm, was packed into a polyvinyl chloride pipe having a diameter of 300 mm and a length of 1300 mm. Through this packed layer, a waste gas containing 2.3 vol % of $BCl_3$, 1.5 vol % of HCl and 0.1 vol % of HF as calculated at 0° C. under 1 atm, which was discharged by a vacuum pump from a dry etching apparatus for aluminum, was passed at a temperature of 25° C. under a pressure of −20 mm $H_2O$ at a flow rate of 8.5 Nl/min. The gas passed through the packed layer was collected and subjected to chemical analysis. The gas collected after 100 hours from the initiation of the introduction of the gas was analyzed and found to contain 1.2 ppm of $BCl_3$, 0.9 ppm of HCl and 1 ppm of HF.

EXAMPLE 2

Thirty kg of magnesium oxide particles (light-burned magnesia, manufactured by Hokkaido Soda Co., Ltd.) having a specific surface area of 120 $m^2/g$ as measured by BET method, an apparent specific gravity of 0.45 and an average particle size of 2 mm, was packed into the same type of pipe as used in Example 1. Through this packed layer, a waste gas containing 2.1 vol % of $SiCl_4$ as calculated at 0° C. under 1 atm, which was discharged by a vacuum pump from a dry etching apparatus for aluminum, was passed at a temperature of 25° C. under a pressure of −20 mm $H_2O$ at a flow rate of 8.5 Nl/min. The gas passed through the packed layer was collected and subjected to chemical analysis. The gas collected after 50 hours from the initiation of the introduction of the gas was analyzed and found to contain 0.9 ppm of $SiCl_4$.

EXAMPLE 3

Thirty kg of magnesium oxide particles (light-burned magnesia, manufactured by Hokkaido Soda Co., Ltd.) having a specific surface area of 180 $m^2/g$ as measured by BET method, an apparent specific gravity of 0.45 and an average particle size of 4 mm, was packed into the same type of pipe as used in Example 1. Through this packed layer, a waste gas containing 1.2 vol % of $SiF_4$ as calculated at 0° C. under 1 atm, which was discharged by a vacuum pump from a dry etching apparatus for silicon, was passed at a temperature of 25° C. under a pressure of −20 mm $H_2O$ at a flow rate of 8.5 Nl/min. The gas passed through the packed layer was collected and subjected to chemical analysis. The gas collected after 50 hours from the initiation of the introduction of the gas was analyzed and found to contain 1.1 ppm of $SiF_4$.

What is claimed is:

1. A method for treating a waste-gas containing a fluorine component and/or a chlorine component, which comprises:
   contacting the waste gas with magnesium oxide particles which have a specific surface area of from 100 to 200 $m^2/g$ and a particle size ranging from 0.5 to 10 mm.

2. The method according to claim 1, wherein the fluorine component is $SiF_4$ or HF.

3. The method according to claim 1, wherein the chlorine component is $BCl_3$, $SiCl_4$ or HCl.

4. The method according to claim 1, wherein the waste gas is a waste gas discharged from dry etching treatment.

5. The method according to claim 1, wherein the specific surface area of said magnesium oxide particles ranges 110 to 190 $m^2/g$.

6. A method for treating a waste-gas containing a fluorine component and/or a chlorine component, which comprises:
   contacting the waste gas with a fixed bed of magnesium oxide particles which have a specific surface area of from 100 to 200 $m^2/g$ and a particle size ranging from 0.5 to 10 mm.

* * * * *